Figure 1:
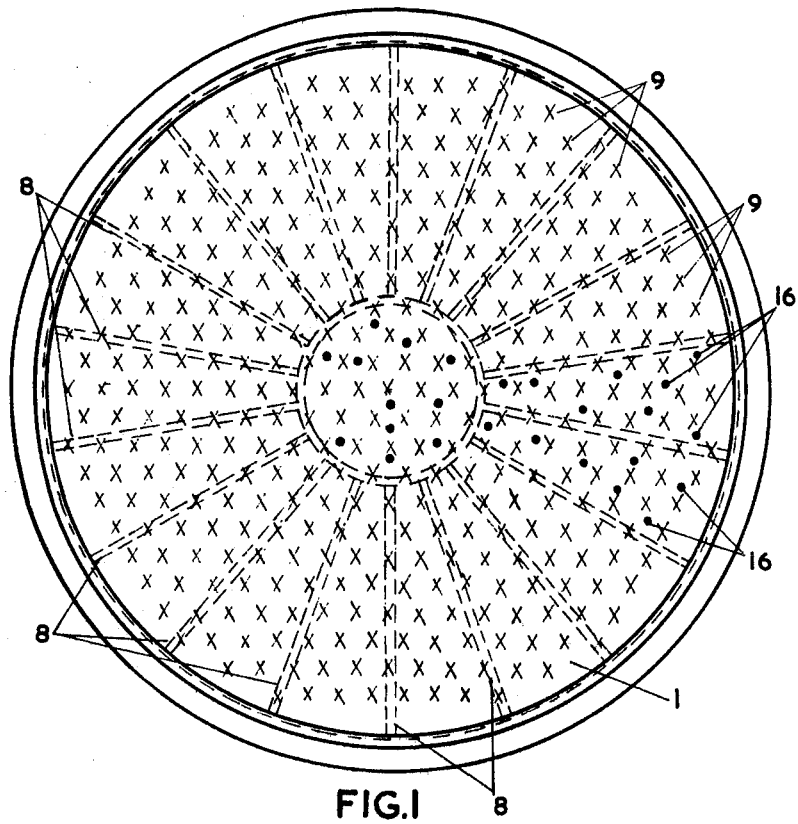

United States Patent [19]
Haigh et al.

[11] 4,083,538
[45] Apr. 11, 1978

[54] CLOSURE MEANS

[75] Inventors: Harold Edward Haigh, Cleveland; Dietrich Adolf Hofmann, Newcastle on Tyne, both of England

[73] Assignee: Tioxide Group Limited, Cleveland, England

[21] Appl. No.: 799,534

[22] Filed: May 23, 1977

[30] Foreign Application Priority Data

Jun. 2, 1976  United Kingdom ............... 22728/76

[51] Int. Cl.² ............................................. C22B 1/10
[52] U.S. Cl. ..................................... 266/172; 266/99
[58] Field of Search .................... 266/87, 88, 99, 172; 75/9, 26; 432/15, 47, 58

[56] References Cited

U.S. PATENT DOCUMENTS

| 3,277,582 | 10/1966 | Munro et al. | 432/58 |
| 3,542,523 | 11/1970 | Wall | 266/172 |
| 3,578,798 | 5/1971 | Lapple et al. | 432/58 |
| 3,598,374 | 8/1971 | Nauta | 432/58 |
| 3,796,551 | 3/1974 | Pope | 432/58 |

FOREIGN PATENT DOCUMENTS 1,255,811  12/1971  United Kingdom ................... 432/58

Primary Examiner—Gerald A. Dost
Attorney, Agent, or Firm—Schuyler, Birch, Swindler, McKie & Beckett

[57] ABSTRACT

A pressure vessel base closure means including a pair of flat disc-like members spaced apart by a peripheral outer cylindrical member and an inner perforated cylindrical member, and there being provided between the two flat disc-like members a plurality of radially directed ribs to provide rigidity to the base closure means. The base closure means is particularly useful for a reactor in which a bed of fluidized solid is maintained by the passage of a gas into the reactor through the base via the chamber between the two flat disc-like members.

7 Claims, 4 Drawing Figures

CLOSURE MEANS

This invention relates to closure means and particularly to a base member for a pressure vessel.

According to the invention a closure means suitable for use with a pressure vessel comprises first and second flat disc-like members spaced coaxially apart, a peripheral cylindrical support member secured to each disc-like member, an inner perforated cylindrical spacing member mounted coaxially with said peripheral support member and secured to each disc-like member, a plurarlity of rib-like members extending radially of the disc-like members between the inner spacing member and the peripheral support member and secured to the disc-like members and the spacing and the support members, said first flat disc-like member having a plurality of apertures for the passage of a gaseous medium through the member and said second flat disc-like member having at least one aperture to permit the introduction of a gas into the region between the two disc-like members.

According to a preferred form of the invention a reactor suitable for use in the chlorination of a titanium-bearing ore has a base region with a plurality of gas distribution tubes (or tuyeres) surrounded by infilling material and a closure means in accordance with the immediately preceding paragraph, with each of said apertures in said first flat disc-like member communicating with a gas distribution tube and means to supply chorine gas to the region between the two flat disc-like members via the aperture in said second flat disc-like member.

As stated the closure means is of particular use as the base of a reactor in which chemical reactions are carried out under pressure, such as the chlorination of a solid particulate titanium-containing ore, which is maintained in fluid suspension by the flow of a fluidising and reactant gas, chlorine, admitted to the reactor through a number of tuyeres or gas distribution tubes. The base provides a means of location of such tuyeres and also the incorporation of radial ribs within the box formed between the two flat disc-like members provides strength even when there is substantial corrosion of the first flat disc-like member by the action of the chlorine gas.

The closure means constructed in accordance with the present invention essentially includes two spaced but parallely positioned flat disc-like members formed of metal, such as steel, with an inner-perforated cylindrical spacing member coaxially mounted with the two disc-like members and secured to each member. Attached to each disc-like member at the periphery thereof is a peripheral cylindrical support member which, with the disc-like members, forms a box-like member. Preferably the peripheral cylindrical support member extends to form a flange to provide mounting means for the closure means with the reactor vessel with which it is to be used.

A plurality of ribs extend radially from the inner spacing member to the peripheral support member. The ribs are secured to the support members and to the inner face of each flat disc-like member. The number of ribs depends on the size of the flat disc-like member and also on the degree of reinforcement required, but usually the number of ribs is such that the angle subtended at the centre of each disc-like member by projections of adjacent ribs is from 10 degrees to 60 degrees. The chamber formed between the disc-like members acts as a gas distribution chamber.

The first flat disc-like member has a number of apertures for the passage of a gaseous medium through the disc-like member. These apertures communicate with the gas distribution tubes and usually the disc-like member is provided with locating tubes to align the gas distribution tube with the corresponding aperture.

The second disc-like member has an aperture to permit the introduction of the gas into the region between the two disc-like members, and usually this aperture is centrally located and provided with means to connect to a gas supply main. Additionally, apertures may be provided in the second disc-like member through which thermometers can be positioned in corresponding recessed portions of the first flat disc-like member to detect the temperature of the first flat disc-like member in the region of the gas distribution tube. Preferably, the thermometers are so positioned that each thermometer is mounted within the proximity of three different gas distribution tubes to detect any inordinate rise in temperature.

Figure 2:
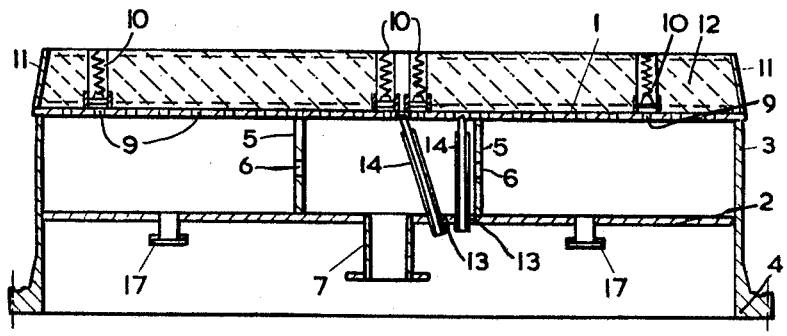
Figure 3:
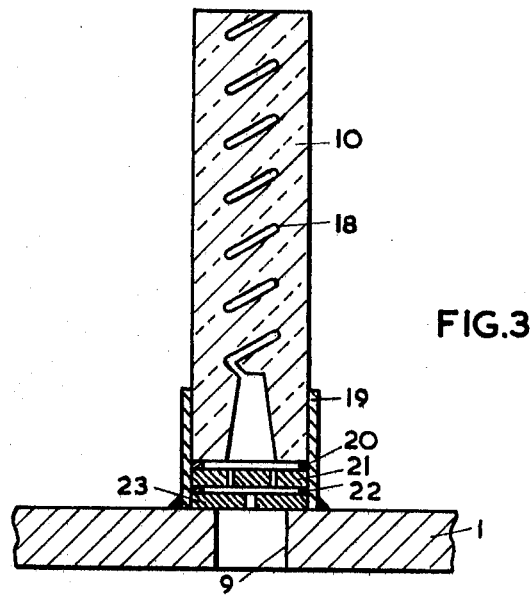
Figure 4:
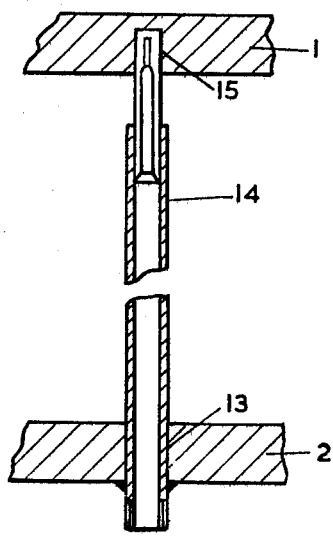

One form of closure means constructed in accordance with the invention will now be described with reference to the accompanying drawings in which FIG. 1 is a plan view of the closure means, FIG. 2 is a sectional elevation through the closure means, FIG. 3 is an elevation of a mounted tuyere, and FIG. 4 is a sectional elevation of a thermometer locating tube.

As shown in FIGS. 1 and 2 the closure means consists of a first flat disc 1 and a second flat disc 2 secured to a peripheral cylindrical support member 3. The cylindrical support member 3 is extended below the disc 2 and has a flange 4 to provide means of attachment to the body of a reactor (not shown). The inner cylindrical spacing member 5 is secured to each disc 1 and 2 and the inner support 5 has a number of perforations 6 to permit the passage of a gas into the region between two discs 1 and 2 from the centrally located gas supply means 7 in the second disc 2. A series of equiarcuately spaced ribs 8 extend from the inner support 5 to the peripheral support 3. The ribs are secured to the inner faces of discs 1 and 2 and to the supports 3 and 5.

The first disc 1 has a number of apertures 9, the location of which is shown in FIG. 1 and which corresponds to the position of the gas distribution tubes 10 or tuyeres. In FIG. 2 a representative number of tuyeres 10 are shown. The remainder being omitted for the sake of clarity.

Extending upwardly from the upper face of the disc 1 is a peripheral skirt 11 which provides a support for the ceramic infilling 12 surrounding the tuyeres 10 when in use.

The disc 2 is additionally provided with a number of apertures 13 in which a thermometer locating tube 14 is positioned and the disc 1 has a corresponding recess 15 to locate the upper end of the thermometer locating tube 14. The distribution of the recesses, and accordingly the thermometers, over the first disc member 1 is shown at 16 in FIG. 1, and as can be seen, each thermometer is mounted adjacent three gas distribution tubes 10.

The second disc 2 is provided with drainage means 17 which are normally sealed when the closure means is in use, but which permit the draining of any accumulated liquid from the chamber formed between discs 1 and 2.

The gas distribution tube 10 or tuyere is shown in more detail in FIG. 3. The gas distribution tube 10 is formed of ceramic material and has a central helical passageway 18. The gas distribution tube 10 is mounted within a tuyere locating tube 19 secured to the upper surface of the disc 1. The base of the gas distribution tube 10 is mounted on a series of aperture discs 20, 21, 22 and 23. The staggered apertures prevent inadvertant fall of fluid bed particles into the gas distribution chamber from the tuyere should the tuyere fail.

The particular form of the thermometer locating tube 14 is shown in FIG. 4.

What is claimed is:

1. Closure means suitable for use with a pressure vessel which comprises first and second flat disc-like members spaced coaxially apart, a peripheral cylindrical support member secured to each disc-like member, an inner perforated cylindrical spacing member mounted coaxially with said peripheral support member and secured to each disc-like member, a plurality of rib-like members extending radially of the disc-like members between the inner spacing member and the peripheral support member and secured to the disc-like members and the spacing and support members, said first flat disc-like member having a plurality of apertures for the passage of a gaseous medium through the member and said second flat disc-like member having at least one aperture to permit the introduction of a gas into the region between the two disc-like members.

2. Closure means according to claim 1 in which the number of such ribs is such that the angle subtended at the centre of each disc-like member by projections of adjacent ribs is from 10 degrees to 60 degrees.

3. Closure means according to claim 1 in which the peripheral cylindrical support member is provided with a flange for mounting the closure means on a pressure vessel.

4. Closure means according to claim 1 in which the second disc-like member is provided with apertures each adapted to locate a thermometer.

5. A reactor suitable for use in the chlorination of a titanium-bearing ore comprises a base region with a plurality of gas distribution tubes surrounded by infilling material and base closure means comprising first and second flat disc-like members spaced coaxially apart, a peripheral cylindrical support member secured to each disc-like member, an inner perforated cylindrical spacing member mounted coaxially with said peripheral support member and secured to each disc-like member, a plurality of rib-like members extending radially of the disc-like members between the inner spacing member and the peripheral support member and secured to the disc-like members and the spacing and support members said first flat disc-like member having a plurality of apertures for the passage of a gaseous medium through the member and said second flat disc-like member having at least one aperture to permit the introduction of a gas into the region between the two disc-like members, with each of said apertures in said first flat disc-like member communicating with a gas distribution tube and means to supply chlorine gas to the region between the two flat disc-like members via the aperture in said second flat disc-like member.

6. A reactor according to claim 5 in which the first flat disc-like member is recessed corresponding to apertures in said second flat disc-like member and each aperture locates a thermometer to detect the temperature of the first flat disc-like member in the region of the gas distribution tubes.

7. A reactor according to claim 6 in which the thermometers are so positioned that each is mounted within the proximity of three different gas distribution tubes.

* * * * *